May 5, 1942.  C. T. WALTER  2,281,609
PREPARATION OF GELATIN STOCK
Filed Sept. 9, 1939
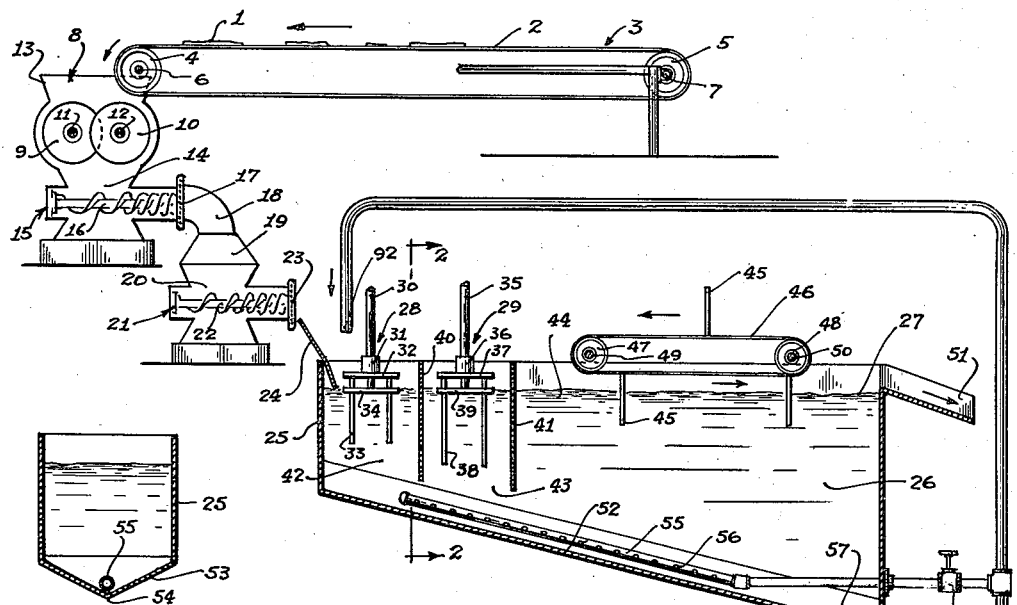
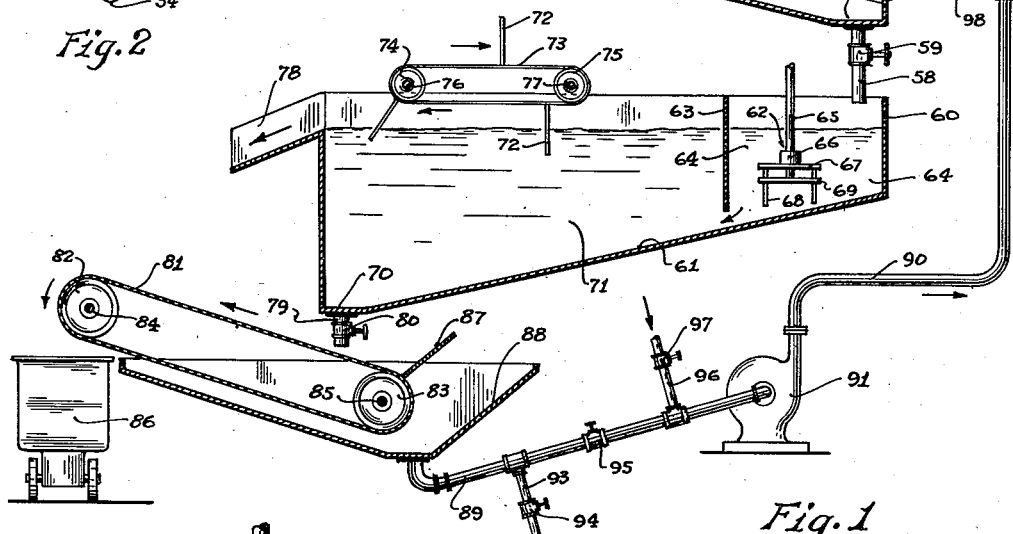
Fig. 1
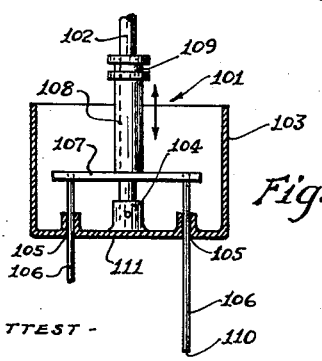
Fig. 3
Charles T. Walter
INVENTOR
ATTEST -

Patented May 5, 1942

2,281,609

UNITED STATES PATENT OFFICE 2,281,609

PREPARATION OF GELATIN STOCK

Charles T. Walter, Chicago, Ill., assignor to Industrial Patents Corporation, Chicago, Ill., a corporation of Delaware Application September 9, 1939, Serial No. 294,209

9 Claims. (Cl. 146—219)

This invention relates to the preparation of stock for gelatin manufacture.

Gelatin may be prepared from several animal sources, the most important commercial sources being bones and pork skins, although from time to time some gelatin is prepared from calf skins.

The highest grade of gelatin produced commercially is produced from pork skins, a by-product of the packing industry. Due to the fatty layer underlying the skin on a pork carcass, gelatin skins must be defatted before they are commercially acceptable as gelatin stock. It has been the practice in the industry to defat gelatin skins by various means, such as belly skinning machines, back fat skinning machines, and skinning knives and similar devices. After skins have been thus partially defatted they are passed one or more times through a fleshing machine to remove as much of the fat as possible.

The hand operations necessarily involved in the conventional process render it so costly that it is generally not applied to skins smaller in area than about twenty-five square inches.

The present invention provides a method for defatting gelatin skins which may be applied economically to skins of any size, thus permitting the use for gelatin stock of relatively small scrap skins.

In one aspect the present invention involves the separation of skin and fat by a combination which involves comminution and flotation.

The invention will be readily understood by reference to the drawing in which similar reference characters indicate similar parts of the several figures.

Figure 1 is a diagrammatic side view partly in section of suitable apparatus.

Figure 2 is a sectional view on line 2—2 of Figure 1.

Figure 3 is a detailed view partly in section of a suitable agitator.

In employing the apparatus depicted in Figure 1, pork skins 1 are placed upon the flight 2 of slow moving conveyor 3. The flight 2 may be of the endless belt type of suitable width and is mounted upon rollers 4 and 5 which in turn are respectively mounted upon shafts 6 and 7 driven by a source of power not shown.

The skins 1 which are in the condition in which they have been removed from the carcass without any intervening defatting or fleshing operations are delivered to the cutter 8 which may consist of two sets of rotary knives 9 and 10 mounted upon and driven by shafts 11 and 12, respectively, being positioned in hopper 13.

After the preliminary cutting by the knives 9 and 10, product falls through throat 14 of hasher 15, provided with worm 16 and plate 17. From hasher 15 the product passes through pipe 18 and hopper 19 to the throat 20 of hasher 21, provided with worm 22 and plate 23. A standard sausage meat hasher is satisfactory for the purposes. In practice it is preferable that plate 17 of hasher 15 be provided with five-sixteenths inch holes and that plate 23 of hasher 21 be provided with three-sixteenths inch holes. It is not essential to the process to have two hashers working in tandem, and the skins may be put directly through a single hasher having a plate with holes approximately three-sixteenths inch in diameter. However, in order to obtain a high rate of production and to reduce the mechanical load on the hasher, it is desirable to have two hashers working together as shown in Figure 1.

The hashed mass of skin and fat passes from hasher 21 over slide 24 to tank 25 filled with water 26 to level 27 and tends to float on the surface of the water. To facilitate separation of the skin and fat, the water is maintained at a temperature of approximately 100 degrees F. Upon entry into tank 25 the hashed mass of skin and fat is subjected to violent agitation by agitators 28 and 29. Agitator 28 is propelled by shaft 30 by a source of power not shown which rotates shaft 30. At the end of shaft 30 is a collar 31 to which are affixed plates 32. Agitator arms 33 are rigidly affixed to plates 32 and braced with plates 34 rigidly affixed to the end of shaft 30. The agitator 29 is similar to agitator 28. Agitator 29 is propelled by shaft 35 by a source of power not shown which rotates shaft 35. At the end of shaft 35 is collar 36 to which are affixed plates 37. Agitator arms 38 are rigidly affixed to plates 37 and braced with plates 39 rigidly affixed to the end of shaft 35.

As a result of the temperature of the water and the agitation by agitators 28 and 29, the skin and fat tend to separate, the fat floating to the surface of the water and the skin falling to the bottom. To assist in retaining the material in the zones of agitation for a prolonged period baffles 40 and 41 may be provided, thus providing compartments 42 and 43.

During the beating action in the presence of the warm water, the skin tissue is effectively freed from the fat. The skins immediately sink to the bottom of the tank and the fat remains floating on the surface of the water, tending to float out into the quiet potrion of the tank represented as 44. The floating fat may be effectually skimmed from the surface of the water by paddles 45 mounted upon slow moving conveyor flight 46 moving in the direction of the arrows. Flight 46 is mounted upon rollers 47 and 48 which in turn are mounted upon shafts 49 and 50, respectively. Paddles 45 which reach across the entire width of the tank 25 skim off the fat and pass it into trough 51 from whence it may be conveyed to storage or to a suitable rendering tank. The small pieces of skin fall to the bottom 52 in tank 25 which is provided with sloping sides 53, forming an index at 54 as is shown in Figure 2. At the bottom of tank 25 pipe 55 provided with a hole 56 permits warm water to be emitted in the mass of pieces of skin passing down the bottom 52, giving a general agitation to the skin and assisting in the further separation of small pieces of fat which may be adhering to the skin, permitting fat to float to the surface. The small pieces of skin accumulating in the portion 57 of tank 55 are passed through line 58 provided with valve 59 to tank 60, having sloping bottom 61 and provided with agitator 62 and baffle 63, forming compartment 64 for the agitator 62. Agitator 62 is propelled by shaft 65 by a source of power not shown which rotates shaft 65. At the end of shaft 65 is collar 66 to which are affixed plates 67. Agitator arms 68 are rigidly affixed to plates 67 and braced with plates 69 rigidly affixed to the end of shaft 65.

Since treatment in tank 25 substantially defats the skin, most of the material drops to the bottom promptly upon entry into tank 60. Agitator 62 is designed to agitate the material at the bottom to free the fat. Baffle plate 63 extends across the entire width of tank 60 and the skins pass thereunder to the lower portion 70 of tank 60. After the agitated water passes beneath baffle 63 and reaches a relatively quiet portion of the tank 60 designated at 71, the fat tends to rise to the surface. The floating fat may be effectually skimmed from the surface of the water by paddles 72 mounted upon slow moving conveyor flight 73 moving in the direction of the arrows. Flight 73 is mounted upon rollers 74 and 75 which in turn are mounted upon shafts 76 and 77, respectively. The fat skimmed from the surface of the water in tank 60 passes through trough 78 to storage or to a suitable rendering tank.

Fat free skin accumulating in the portion 70 of tank 60 is removed through pipe 79 provided with valve 80, and the water which accompanies the skin may be separated in any suitable manner as by means of a perforated washing drum or by means of a screen type of conveyor 81 as shown. The screened conveyor 81 is mounted upon rollers 82 and 83 which in turn are mounted upon shafts 84 and 85, respectively, shaft 84 being elevated with respect to shaft 85 to provide an inclined flight whereby product may be delivered to truck 86. Back plate 87 prevents the defatted skin from falling back into hopper 88 which receives the water from the dewatered skins. The water in pan 88 may be returned to processing tank 25 through pipes 89 and 90, being propelled by pump 91, whereby the water is discharged into tank 25 through the nozzle end 92 of pipe 90. If desired, the water from pan 88 may be diverted through pipe 93 by opening valve 94 and closing valve 95. In such case if it is desired to pass water into the system consisting of pipes 55 and 90, it may be done through pipe 96 provided with valve 97. The flow of water from pipe 90 through pipe 55 is controlled by a valve 98. Where stringy fiber naturally present in the hashed material entering the first tank tends to entangle with the beater arms of the agitators, it is desirable to prevent building up substantial quantities of this fiber around the agitator arms. A suitable agitator for the avoidance of this difficulty is shown in Figure 3.

The agitator 101 shown in Figure 3 is mounted upon shaft 102. Cup 103 is affixed to the end of shaft 102 as at 104. Holes 105 in the bottom of cup 103 permit passage of agitator arms 106 which are firmly attached to a cross bar 107, which is in turn a part of sleeve 108 which is adapted to slide freely along the shaft 102. Groove 109 in sleeve 108 is provided to permit a yoke to give an oscillating motion to the sleeve 108.

As the shaft 102 rotates the arms 106 through the described assembly, the arms 106 move up and down so that periodically the bottom surfaces 110 of arms 106 are flush with the bottom 111 of cup 103 whereby material which may have become entangled with the arms 106 is stripped from the arms thus preventing accumulation of an objectional amount of the stringy fiber.

I have found in practice that hasher plates with three-sixteenths inch holes give the optimum condition with respect to fat content of the skin. It is desirable in preparing pork skins for use in the manufacture of gelatin to eliminate as much fat as possible.

In carrying out the present invention using a hasher having a hasher plate with three-sixteenths inch holes I have found that the fat content of the finished skins is less than four per cent, which is excellent. Hasher plates with holes as small as one-sixteenth inch and hasher plates as large as five-sixteenths inch show a percentage of fat which is unsatisfactory for the best work in extracting gelatin from skins.

The process of the present invention has many advantages over conventional practice. In the first place, there is a definite reduction in the cost of preparing pork skins in the manufacture of gelatin when the method of the present invention is employed. In the second place, analyses show that pork skins prepared in accordance with the present invention have a lower percentage of fat in the finished skin than is the case with known commercial methods of pork skin preparation.

An important advantage of the present invention is that it renders it unnecessary to limit the size of skins selected for gelatin manufacture. All pieces of skin, no matter how small, may be satisfactorily handled with equal economy in the process of the present invention thus increasing the amount of skin available for gelatin purposes, a matter which is particularly important at times when the skin market is high. It will be seen, therefore, that the present invention involves the separation of fat from protein by a method which involves purely mechanical steps and which eliminates expensive hand labor. It will be understood, of course, that the present invention may be carried out in any of several ways without departing from the spirit of the invention. For example, a centrifugal machine may be employed to effect the separation of the fat and the lean after the hashing and the warming operation. In using a centrifugal machine it is, of course, preferable to treat the material with warm water.

By another variation of the process the fat and lean may be separated in the manner which has been described with the equipment shown in the drawing, and with a centrifugal wringer excess water may be removed from the skin recovered at the bottom of the vat.

The function of the hasher plate in carrying out the process of the present invention is twofold, first, to cut the skin or trimmings into smaller pieces and, second, but more important, to mechanically scrape fat from the lean. The toughness of pork skin tissue requires the application of heavy mechanical forces to subdivide it, and these forces serve to scrape the fat from the individual pieces of skin so that it is readily separable in water. One of the important elements involved in the process of the present invention is the violent mechanical working of the mass of skin with its attached fat so as to subdivide the skin into small pieces and at the same time to sever the fat from the skin. In the case of treating pork skins for the preparation of gelatin stock another important feature is the subjecting of the mixture of fat and skin at a temperature of approximately 100 degrees F. to partially melt the fat and allow it to separate freely from the skin in the presence of water. It will be seen that the present invention employs a most convenient separating medium, namely, water, which will float the fat and allow the skin to sink.

It is conventional in preparing pork skins for gelatin stock to proceed as has been described and to ship the skins in the defatted condition. The present invention permits a further advance since the small pieces of skin prepared by the process of the present invention may be readily dried at a great saving in handling and freight costs. In addition to its adaptability for use in preparing gelatin stock from fresh pork skins, the present invention may be effectively employed in many instances where it is desirable to separate the fat from non-fatty animal tissue.

The practice of the method of the present invention upon pork skins separated from fat after hashing and then dried results in a new product which is a gelatin stock consisting of dehydrated skin pellets.

The term gelatin stock used in the specification and claims includes edible and inedible varieties; for example, a common edible variety is that used in the manufacture of gelatin for gelatin desserts, and a usual type of inedible variety is that employed as a source of glue.

I claim:

1. The method of treating animal tissue having portions of fatty material and portions of non-fatty material of relatively tougher tissue than said portions of fatty material, which comprises, subjecting said animal tissue to a hashing operation involving cutting and scraping actions to cut the non-fatty material into particles and scrape the fatty material therefrom as particles of fatty material, distributing the resultant mixture into sufficient water to provide for separation and stratification of said particles in said water, maintaining the temperature of said water during said separation below the rendering temperature of said fatty material, whereby said particles of non-fatty tissue sink in said water and said particles of said fatty material are disengaged from said particles of non-fatty material and rise to the top of said water, and separately recovering said fatty and non-fatty material.

2. The method of treating animal tissue having portions of fatty material and portions of non-fatty material of relatively tougher tissue than said portions of fatty material, which comprises, subjecting said animal tissue to a hashing operation involving cutting and scraping actions to cut the non-fatty material into particles and scrape the fatty material therefrom as particles of fatty material, introducing the resultant mixture into sufficient water to provide for separately suspending said particles in said water, agitating said mixture in said water to cause separation of said particles, transferring the water containing said particles to a quiescent zone to provide for stratification of said particles in said water, maintaining the temperature of said water during said separation below the rendering temperature of said fatty material, whereby said particles of non-fatty tissues sink in said water and said particles of said fatty material are disengaged from said particles of non-fatty material and rise to the top of said water, and separately recovering said fatty and non-fatty material.

3. The method of treating animal tissue having portions of fatty material and portions of non-fatty material of relatively tougher tissue than said portions of fatty material, which comprises, subjecting said animal tissue to a hashing operation involving cutting and scraping actions to cut the non-fatty material into particles and scrape the fatty material therefrom as particles of fatty material, separating said particles by distributing the resultant mixture in a relatively large volume of water, maintaining the temperature of said water during said separation below that which will melt a substantial portion of said fatty material, whereby said particles of non-fatty tissue sink in said water and said particles of fatty material are disengaged from said particles of non-fatty material and rise to the top of said water, and separately recovering said fatty and non-fatty material.

4. The method of treating animal tissue having portions of fatty material and portions of non-fatty material of relatively tougher tissue than said portions of fatty material, which comprises, subjecting said animal tissue to a hashing operation involving cutting and scraping actions to cut the non-fatty material into particles and scrape the fatty material therefrom as particles of fatty material, distributing the resultant mixture into sufficient water to provide for separately suspending said particles, separating said particles of fatty material from said particles of non-fatty material by stratification in said water, the fatty material being lighter than said water and forming a lighter layer and the non-fatty material being heavier than said water and forming a heavier layer, maintaining the temperature of said water during said separation below the rendering temperature of said fatty material and separately recovering said layers of fatty material and non-fatty material.

5. The process of treating animal tissue having a layer of fatty material adhering to a relatively tougher skin-like layer of non-fatty material, which comprises, subjecting said animal tissue to a hashing operation involving cutting and scraping actions to cut the non-fatty material into particles and scrape the fatty material therefrom as particles of fatty material, distributing the resulting mixture in sufficient water to provide for separation and stratification of said particles in said water, maintaining the temperature of said water during said separation below the rendering temperature of said fat but sufficiently high to soften said fat, whereby said particles of said non-fatty material sink in said water and discrete particles of fatty material are disengaged from said particles of non-fatty material and rise to the top of said water, and separately recovering said fatty and non-fatty material.

6. The method of separating fat from fatty animal skins to produce a substantially defatted skin suitable for the manufacture of gelatin, which comprises, subjecting the skins to a hashing operation involving cutting and scraping actions to cut the skin into particles and scrape the fat therefrom as particles of fatty material, distributing the resultant mixture into sufficient water to provide for separation and stratification of said particles in said water, maintaining the temperature of said water during said separation below the rendering temperature of said fat but sufficiently high to soften said fat, separating the particles of fatty material from said particles of non-fatty material by flotation in said water, the particles of non-fatty material sinking in said water and discrete particles of fatty material rising to the top of said water, recovering said fatty material and separately recovering comminuted defatted skin suitable for gelatin manufacture.

7. The method of separating fat from fatty animal skins to produce a substantially defatted skin suitable for the manufacture of gelatin, which comprises, subjecting the skins to a hashing operation involving cutting and scraping actions to cut the skin into particles and scrape the fat therefrom as particles of fatty material, distributing the resultant mixture into sufficient water to provide for separation and stratification of said particles in said water, maintaining the temperature of said water during said separation below the rendering temperature of said fat but sufficiently high to soften said fat, separating the particles of fatty material from said particles of non-fatty material by flotation in said water, the particles of non-fatty material sinking in said water and discrete particles of fatty material rising to the top of said water, recovering said fatty material, separately recovering comminuted defatted skin and drying said comminuted non-fatty material to obtain dried particles of defatted skin suitable for gelatin manufacture.

8. The method of treating animal tissue having portions of fatty material and portions of non-fatty material of relatively tougher tissue than said portions of fatty material, which comprises, subjecting said animal tissue to a hashing operation involving cutting and scraping actions to cut the non-fatty material into particles and scrape the fatty material therefrom as particles of fatty material, distributing the resultant mixture into sufficient aqueous liquid having a specific gravity intermediate that of said fatty material and said non-fatty material to provide for separately suspending said particles in said liquid, separating said particles of fatty material from said particles of non-fatty material by stratification in said liquid, the fatty material being lighter than said liquid and forming a lighter layer, and the non-fatty material being heavier than said liquid and forming a heavier layer, maintaining the temperature of said liquid during said separation below the rendering temperature of said fatty material, and separately recovering said fatty and said non-fatty material.

9. The method of treating animal tissue having portions of fatty material and portions of non-fatty material of relatively tougher tissue than said portions of fatty material, which comprises, subjecting said animal tissue to a hashing operation involving cutting and scraping actions to cut the non-fatty material into particles and scrape the fatty material therefrom as particles of fatty material, distributing the resultant mixture into a sufficient amount of liquid having a specific gravity intermediate said fatty material and said non-fatty material and in which said fatty material and non-fatty material is substantially immiscible to provide for separately suspending said particles in said liquid, separating said particles of fatty material from said particles of non-fatty material by stratification in said liquid, the fatty material being lighter than said liquid and forming a lighter layer, and the non-fatty material being heavier than said liquid and forming a heavier layer, maintaining the temperature of said liquid during said separation below the rendering temperature of said fatty material, and separately recovering said fatty from said non-fatty material.

CHARLES T. WALTER.